United States Patent [19]

Schuerman

[11] Patent Number: 4,905,166

[45] Date of Patent: Feb. 27, 1990

[54] METHOD OF GENERATING LINE PARTS

[75] Inventor: Cornelis P. Schuerman, Venlo, Netherlands

[73] Assignee: Oce-Nederland B.V., Venlo, Netherlands

[21] Appl. No.: 290,823

[22] Filed: Dec. 22, 1988

Related U.S. Application Data

[63] Continuation of Ser. No. 943,255, Dec. 17, 1986, abandoned.

[30] Foreign Application Priority Data

Dec. 17, 1985 [NL] Netherlands ................ 8503461

[51] Int. Cl.$^4$ ............................................. G06F 15/40
[52] U.S. Cl. ................................. 364/518; 340/739; 340/728; 382/55
[58] Field of Search ...................... 382/54, 55

[56] References Cited

U.S. PATENT DOCUMENTS

| | | | |
|---|---|---|---|
| 4,031,519 | 6/1977 | Findley | 364/900 |
| 4,262,290 | 4/1981 | Vallins | 340/728 |
| 4,300,136 | 11/1981 | Tsuiki et al. | 340/747 |
| 4,601,002 | 7/1986 | Rosenthal | 364/518 |
| 4,612,540 | 9/1986 | Pratt | 340/793 |
| 4,620,287 | 10/1986 | Yam | 364/518 |
| 4,679,039 | 7/1987 | Neil et al. | 340/728 |
| 4,805,116 | 2/1989 | Liang et al. | 364/521 |

FOREIGN PATENT DOCUMENTS 0112025 6/1984 European Pat. Off. ............ 364/519

OTHER PUBLICATIONS

Gordon, P., "Specialized High Speed Electronics for Document Preparation Flexibility", Hewlett-Packard Journal-6/82, pp. 30-35.

Baker et al., "Graphics Capabilities on a Laser Printer", Hewlett-Packard Journal, 11/83, pp. 17-22.

Bresenham, J., "A Linear Algorithm for Incremental Digital Display of Circular Arcs", IBM System Communications Division G & IP, ACM 2/77, pp. 100-106.

Sproull, R. F., "Using Program Transformations to Derive Line-Drawing Algorithms", ACM Transactions on Graphics, 10/82, pp. 259-273.

Primary Examiner—Gary V. Harkcom
Assistant Examiner—Phu K. Nguyen
Attorney, Agent, or Firm—Reed Smith Shaw & McClay

[57] ABSTRACT

A method of generating a line part having a thickness D on a homogeneous raster, in which the raster points are arranged in a number of parallel lines, and in which the bit representation of the line part is stored in a word-oriented bit-map memory in the form of a large number of image points or pixels. The method provides for making a determination of the envelope of the line part and imaging the envelope on the raster points. Thereafter, determining the length of the section through the line part for successive raster lines, and placing the bit representation of said lengths in the bit-map memory at corresponding locations, so that the direction of the determined lengths corresponds to the word direction of the bit-map memory.

3 Claims, 13 Drawing Sheets

LSM INTERFACE

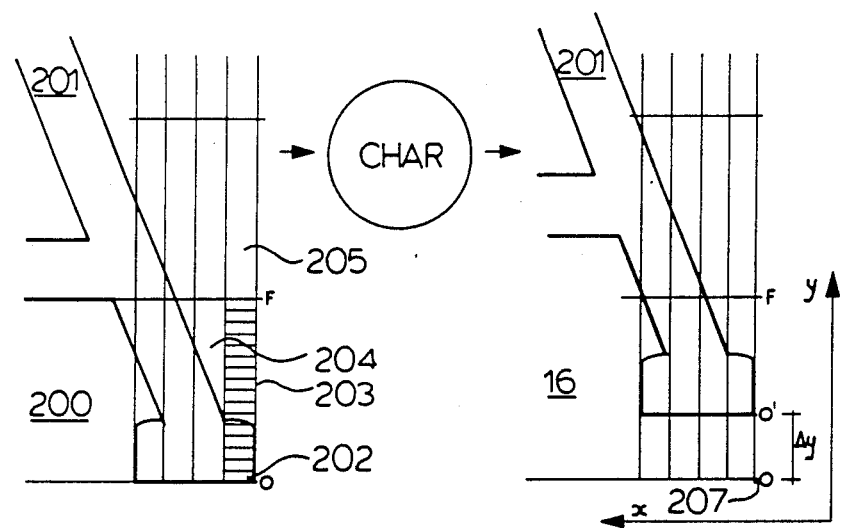
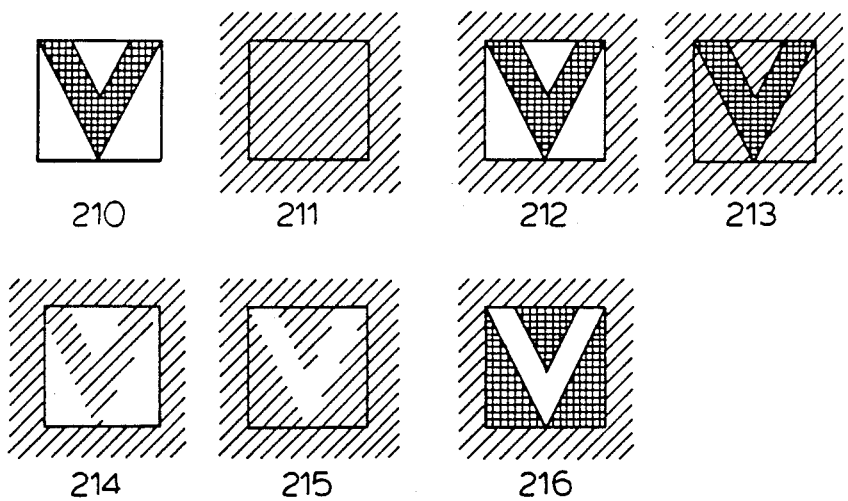
FIG. 10.

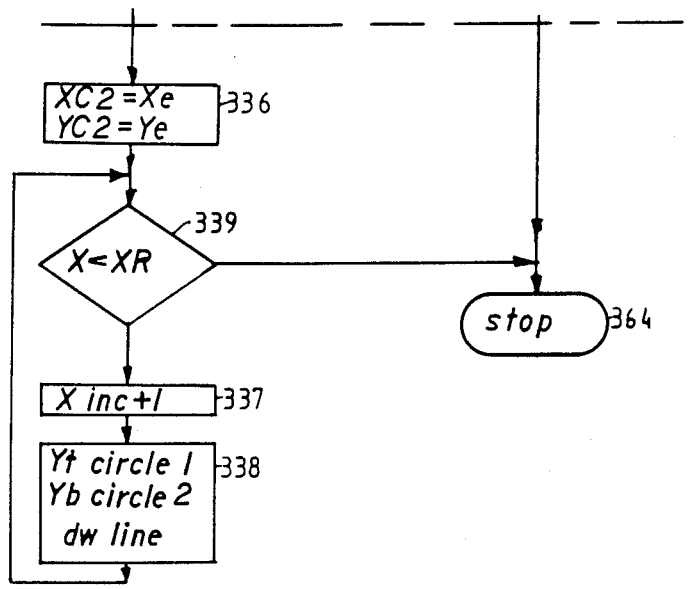
FiG. 17c
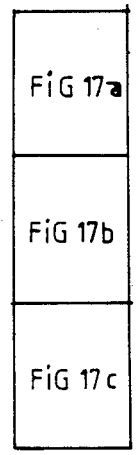

METHOD OF GENERATING LINE PARTS

This is a continuation of co-pending application Ser. No. 06/943,255 Dec. 17, 1986, now abandoned.

FIELD OF THE INVENTION

This invention relates to a method for generating line parts for a raster output scanner (ROS) in order to obtain a printed page.

BACKGROUND OF THE INVENTION

Methods for generating lines for use in printers which have a raster output scanner and which are capable of printing a complete page line-wise with serially presented data are well known. Typically, front-end conversion systems connected to a workstation for inputting text and graphical data are required for laser printers. The laser printer includes a light beam which is modulated image-wise, and the modulated light beam is deflected line-wise by means of a polygonal mirror over a light-sensitive surface. In a known manner a latent image can be written to the light-sensitive surface by means of the modulated light beam. The latent image is thereafter developed in a known manner and transferred to a receiving material such as a sheet of paper.

In the front end the (coded) input text from a workstation is expanded with font data stored in a memory device, and the expanded text is also stored in the bit-map memory of the system. In addition, graphical data, for example of an original, obtained by means of a scanner can be fed to the workstation and bit-map memory.

The workstation is provided with a display by means of which the page to be printed can be composed. The layout of the page can be varied as required via the workstation. Special commands input via the workstation enable the front-end of the printer to generate various curves, e.g., straight lines parts, circles or arcs etc. and locate them in the bit-map memory.

The increasing resolution of raster output scanners makes them increasingly suitable for printing graphical information. The graphical information (line parts or the like) must be imaged on the raster of the raster output scanner. The imaging process comprise determining the collection of raster points to be activated. The activated raster points are thus written in a word-oriented bit-map memory. In view of the large number of raster points to be generated, rapid processing thereof is essential.

Because modern laser printers are capable of printing pages at high speed and with a high resolution, a front-end system will have to be capable of processing the data for said pages at high speed and presenting them to the printer.

U.S. Pat. No. 4,300,206 describes a raster printer in which data of any size and orientation can be printed on a page. A microprocessor receives a succession of coded character and control data. The coded character data are processed by the microprocessor one-at-a time in accordance with the control data and translated into character bit-map data and after that the microprocessor positions these data of character bit map into a strip buffer. However, because the described system operates in a sequential manner, it is a relatively slow system.

The following prior art is of general interest: Baker, et al. "Graphics Capabilities On A Laser Printer" p.17, Hewlett-Packard Journal (Nov. 1983); Sproull, "Using Program Transformations To Derive Line-Drawing Algorithms" AMC Transactions on Graphics, Vol. 1, No. 4 (Oct. 1982); Gordon, "Specialized High-Speed Electronics For Document Preparation Flexibility" p.30, Hewlett-Packard Journal, (June 1982); Bresenham, "A Linear Algorithm For Incremental Digital Display Of Circular Arcs," Communications of the ACM, Vol. 20. No. 2 (Feb. 1977); European Patent Application 0112025 and U.S. Pat. No. 4,031,519.

Accordingly, it is an object of the present invention to provide a method which can generate a line for high speed printing and high resolution printers.

SUMMARY OF THE INVENTION

The present invention provides a high speed method for line generation using simple algorithms to reduce the number of memory access cycles.

Generally, the present invention comprises a method for generating on a homogeneous raster a line part having a thickness D. The raster points are arranged in a number of parallel lines and the bit representation of the line part is stored in a word-oriented bit-map memory in the form of a large number of image points or pixels. The method includes determining the envelope of the line part and imaging the envelope on the raster points and determining the length of a section through the line part for successive raster lines. The bit representations of the lengths in bit-map memory are placed at corresponding locations in the direction corresponding to the word direction of the bit-map memory.

Preferably, the present invention utilizes a front end controller for controlling the front-end which is connected to the printer and an input/output device. The controller is also connected to a standard VME bus (see, e.g., "Backup Support Gives VME bus Powerful Multiprocessing Architecture," Electronic Components and Applications, Vol. 6, No. 3, 1984). An input/output processor and memory units are also connected to the VME bus for storing coded font data and graphical data.

A raster image processor for converting stored bit representation into a serial pixel-bit for inputting to a raster output scanner is connected to the VME bus and to a raster image bus, and includes an output to a raster scanner. A raster image memory is connected to the raster image bus for storing the bit representation of a page.

As described in a preferred embodiment, the raster image bus is a synchronous bus having a plurality of multiplexed address/data lines. By virtue of the second bus, the raster image bus, the front-end processor controls the front-end system and collects data relating to an assembled page independently of and simultaneously with the raster image processor which takes care of expanding coded graphical and font data and placing the data in the raster image memory. The processor also reads the data out of said memory, resulting in providing the printer with data in real time. The method of the present invention provides extremely fast response times.

These and other advantages will become apparent from a perusal of the following detailed description of presently preferred embodiments taken in connection with the accompanying drawings.

BRIEF DESCRIPTION OF THE DRAWINGS

FIG. 9 represents the placing of a character in the bit-map memory;

FIG. 10 represents the results of a number of possible operations in the bit-map memory.

PRESENTLY PREFERRED EMBODIMENTS

Figure 1:
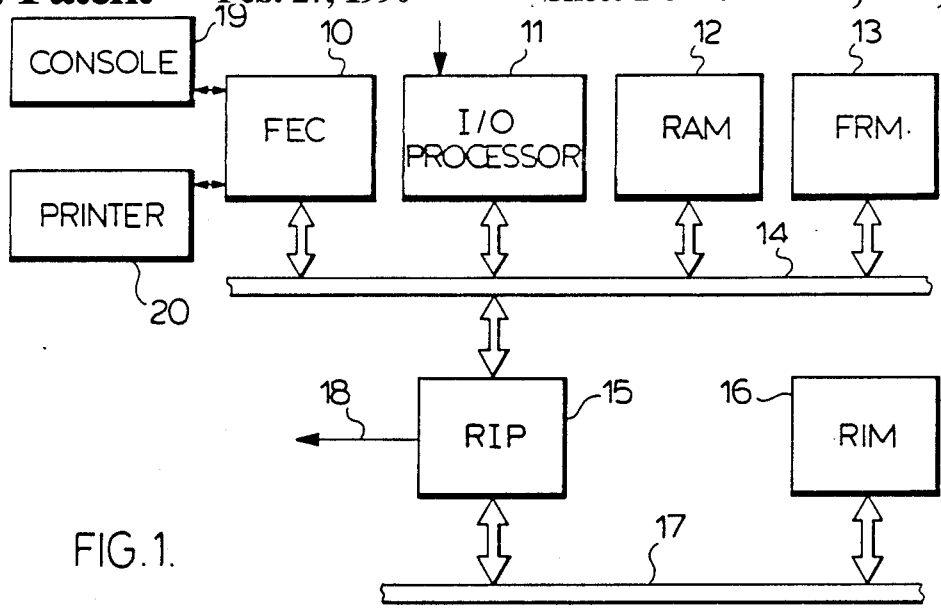
FIG. 1 is a diagrammatic representation of a front-end system.

FIG. 1 is a diagrammatic representation of a front-end system. As shown a front-end controller 10 (FEC) is connected to an operating console 19 and also to the control system of a printer 20. Printer 20 is a raster output scanner in which a light beam is modulated image-wise and is deflected line-wise over the surface of a light-sensitive element. The light-sensitive element is driven perpendicular to the direction of deflection of the light beam in order for it to be possible to write a complete image in raster form. An example of a raster output scanner is a laser printer in which a modulated laser beam is driven by means of a rotating multiface mirror over the surface of a charged photoconductor. The photoconductor is exposed image-wise in this process, and the charged image obtained can be developed in a known manner with toner, then transferred to a receiving sheet and fixed by means of heat.

Front-end controller 10 preferably contains a 16-bit microprocessor system embodying, for example, a Motorola 68000 microprocessor and functions in combination with local ROM and a part of a random access memory 12 (RAM) as the control system for the front end. In font read memory 13 are stored the bit patterns of a number of print types. The front end may be connected via an I/O processor 11, which also contains a 16-bit microprocessor system embodying a Motorola 68000 microprocessor, to a disc memory, work station, computer and/or cluster controller. The FEC 10, I/O processor 11, RAM 12 and font memory 13 are connected o each other via a standard VME bus 14. The font memory 13 can also be constructed as a RAM or form part of RAM 12. The bit patterns of the fonts are then loaded into said RAM from a disc memory or floppy-disc memory.

A raster image processor 15 (RIP) is also connected to VME bus 14. In addition, raster image processor 15 is connected via a raster image bus 17 (RI bus) to a page-size bit-map memory 16, also termed raster image memory (RIM). RIP 15 serves to fill the bit-map memory 16 (RIM) image-wise with type characters that are called up from font memory 13 and deposited in the correct location in bit-map memory 16. In addition, RIP 15 can call up graphical information from memory 12 and also set it aside at the desired locations in bit-map memory 16. If the bit-map memory has been filled, it can be read out again Via RIP 15, the data read out being fed as a serial pixel-bit stream via line 18 to the modulator of the laser printer.

The image which is written on the photoconductor is made up of pixels preferably having a size of 0.05×0.05 mm so that approximately 4,000×6,000 pixels are necessary to print an A4-format black/white image. Consequently, bit-map memory 16 is preferably approximately 24 megabits or 3 megabytes. During read out of bit-map memory 16, the pixel bit rate to the modulator of the laser printer via line 18 is approximately 25 megapixels/sec, resulting in the printing of an A4-format page in approximately 1 sec.

All data relating to a page to be printed are stored in RAM 12 via I/0 processor 11 from, for example, a work station and under the control of FEC 10. For this purpose various options are available, for example, an A4-page, which has to be printed in the "portrait mode." Approximately 4,000 subtables are made corresponding to the approximately 4,000 scan lines which are necessary to write a page. In each subtable, type codes of the type characters or graphical characters are stored which have their starting point on a certain scan line. Each type code contains, in addition, data relating to the X position which the character assumes on the scan line, data relating to the font type and also data relating to the height and width of a certain character. The type code also contains data relating to a base address in the font memory 13, where the bit representation of said character is stored in 16-bit words. The set of lists thus formed is termed the list of primitives.

Once the data relating to a page to be printed have thus been stored in RAM 12, filling bit-map memory 16 can be started. For this purpose the letter codes are called up from RAM 12 one by one by RIP 15 and, together with the associated bit representation from the font memory 13, expanded and deposited at the correct X and Y locations in bit-map memory 16. In a corresponding manner all characters are completed one by one until bit-map memory 16 is completely filled with the pixel representation of the page to be printed.

It is not necessary to form sublists. The data relating to a page to be printed can also be stored in the RAM 12 in a random sequence. During the filling of bitmap memory 16, RAM 12, in which the primitives are placed in a random sequence, is successively read out, expanded, and placed at the respective locations in bit-map memory 16.

In a preferred embodiment all of the characters occurring on a page are stored only once and provided with data relating to the various positions which each character assumes on the page. In this manner, the data relating to a frequently occurring character such as, for example, the letter "e", are only stored once in RAM 12 and all the positions which this letter assumes on the page are inserted in a separate table.

Usually first the graphical characters which are stored in RAM 12 or font memory 13 are placed in bit-map memory 16 and only thereafter the type characters.

THE RASTER IMAGE PROCESSOR

Figure 2:
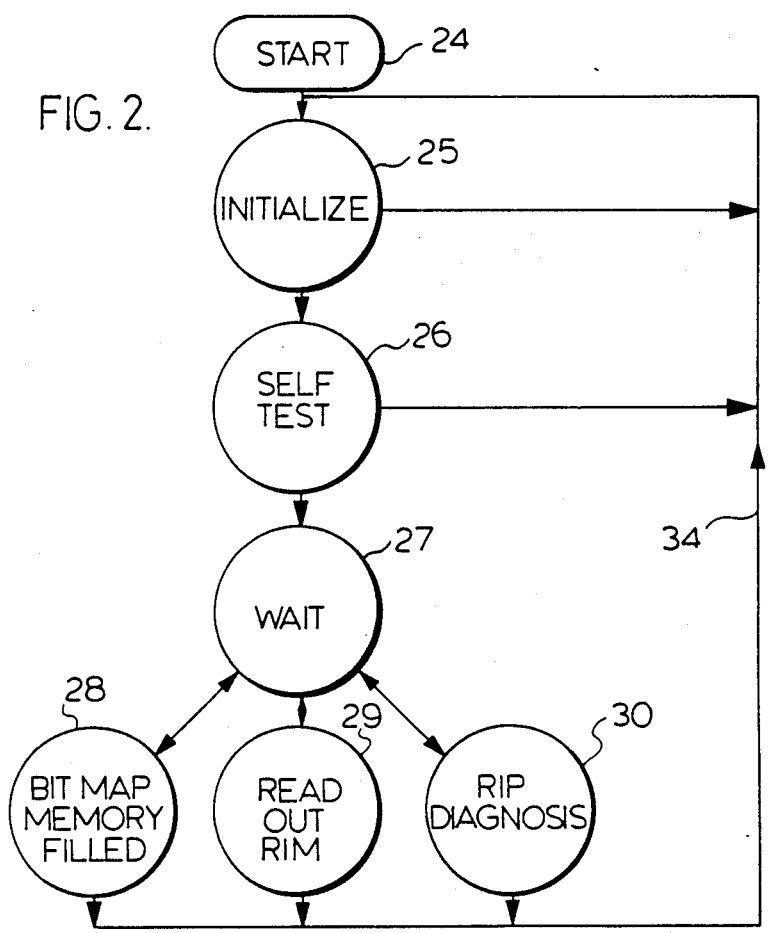
FIG. 2 schematically represents the processes performed by the raster image processor.

Referring to FIG. 2, the processes carried out by the raster image processor 15 are shown schematically (RIP). After starting up the system (Step 24), RIP 15 is initiated (Step 25) (INIT command) by a system reset or an INIT command from front-end controller 10. A "self test" process (Step 26) is started which comprises the testing of various RIP functions and bit-map memory (RIM) functions. RIP 15 must not have access to VME bus 14 during the self-test procedure, because the FEC 10 requires the VME bus 14 for the testing of RAM 12 and font memory 13. If RIP 15 successfully carries out the "selftest" program, an interrupt signal is transmitted to FEC 10 and RIP 15 goes into the wait mode (Step 27). If the self-test program has detected a fault, RIP 15 also goes into the wait mode (Step 27), but no interrupt signal is generated for the FEC 10. In this manner front-end controller 10 knows that a fault has been diagnosed in the RIP 15 "self test". A fault is also indicated to the operator by a LED lighting up.

On an "RIP diagnosis" command from FEC 10 to RIP 15, RIP 15 diagnosis process 30 starts. The RIP 15 performs a number of internal tests and also a number of tests on RIM 16. The results of these tests are stored in RAM 12 and can be transmitted to, and made visible on, operating console 19. The RIP diagnosis process also tests the VME interfaces. The RIP diagnosis process has a more extensive character while the self-test process performs a more functional hardware test. After the termination of the RIP diagnosis process, RIP 15 stores status information in RAM 12, generates an interrupt signal for FEC 10, and unblocks VME bus 14.

After RIP 15 has received a "fill bit map" command from FEC 10, RIP 15 checks the data transfer on VME bus 14. RIP 15 thus acquires access to RAM 12, which contains the primitives of the page which has to be printed.

RIP 15 expands the list of primitives by means of the pixel representations of the fonts and deposits these in bit-map memory 16 (RIM). RIP 15 has access to RIM 16 via RI bus 17. RIM 16 contains, in addition, modification logics which supports RIP 15 in performing various arithmetical operations on data for bit-map memory 16 such as, for example, AND, OR and IN-VERT operations. After the bit map has been filled (Step 28), RIP 15 stores status information in RAM 12, generates an interrupt signal for FEC 10, and unblocks VME bus 14.

FEC 10 then generates a "read bit map" command and RIP 15 waits for a page synchronization signal which originates from the laser printer via a control interface. After the page synchronization is generated, RIP 15 starts by reading out RIM 16 (Step 29) and generates a serial pixel bit stream which is fed to the modulator of the laser printer via a video interface. After the termination of the bit-map reading process (step 29), RIP 15 again stores status data in RAM 12, generates an interrupt signal for FEC 10, and then unblocks VME bus 14.

Figure 3:
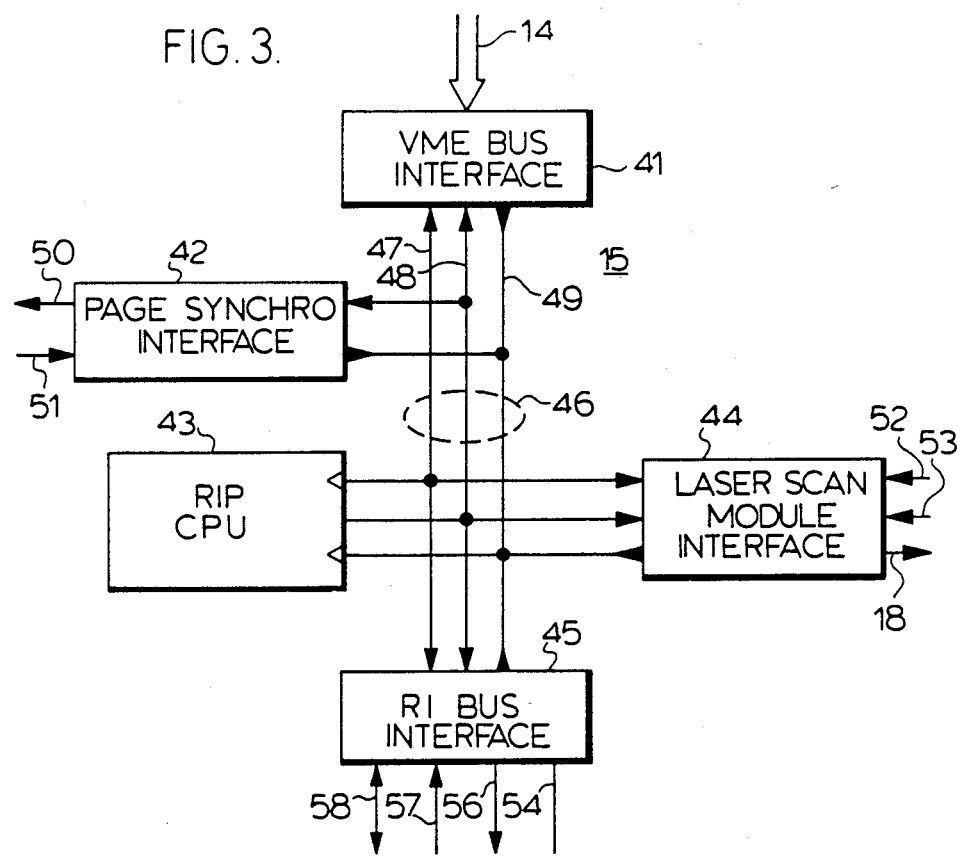
FIG. 3 is a diagrammatic representation of a raster image processor.

With reference to FIG. 3, Rip 15 preferably includes an internal bus system having raster image processor bus 46 (RIP bus) which is a synchronous bus designed to exclusively transfer 16-bit words. RIP bus 46 contains data lines 47, address and control lines 48 and condition lines 49. The RIP bus is connected via a VME bus interface 41 to VME bus 14, and, via an RI bus interface 45, to RI bus 17. RI bus 17 contains, inter alia, data and address lines 58, a busy line 57, an RI bus address available line 56, a clock line 54, and modification lines. In addition, RIP bus 46 is connected to a laser scan module interface 44 (LSM interface) and the central processing unit 43 (CPU) of RIP 15. The laser scan module LSM interface 44 is connected to lines originating from the printer. For example, "start-of-scan" line 52 (SOS), by which a synchronization signal is supplied to indicate the beginning of a line to be printed, a burst line 53, by which a signal is supplied which corresponds to the desired pixel frequency, and a video line 18, by which the serial pixel bit stream is fed to the modulator from the laser printer on reading out bit-map memory 16. The address and control lines 48 and the condition lines 49 are also further connected to a page synchronization interface 42. A "page-available" signal (PAV) is fed to the control device of the printer via line 50. This signal indicates that a page is fully formatted in bit-map memory 16 and that RIP 15 can start reading out bit-map memory 16 on receiving a "start-of-page" signal (SOP) via line 51 which is derived from the control device of the printer.

10 VME-BUS INTERFACE

Figure 4:
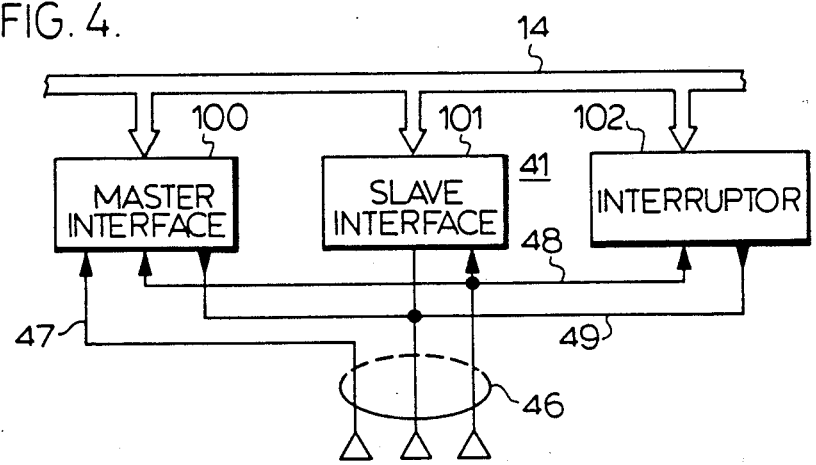
FIG. 4 is a diagrammatic representation of a VME-bus interface.

Referring to FIG. 4, VME-bus interface 41 is diagramatically represented in detail. A master interface 100, a slave interface 101, and an interrupter 02 are connected to VME bus 14. Data lines 47 from RIP bus 46 are connected to master interface 100. The address and control lines 48 are connected, as are the condition lines 49 from RIP bus 46, to master interface 100, slave interface 101, and interrupter 102. The task of the VME-bus interface 41 is to shield RIP 15 from the asynchronous VME bus 14. The VME master interface 100 (VME-MI) contains an internal control system by means of which the buffers and registers present are controlled. This interface permits access cycles to be performed on the VME bus 14. In the control system, programmable logic is used. For the control of slave interface 101 and interrupter 102 preferably programmable logic is provided.

Figure 8:
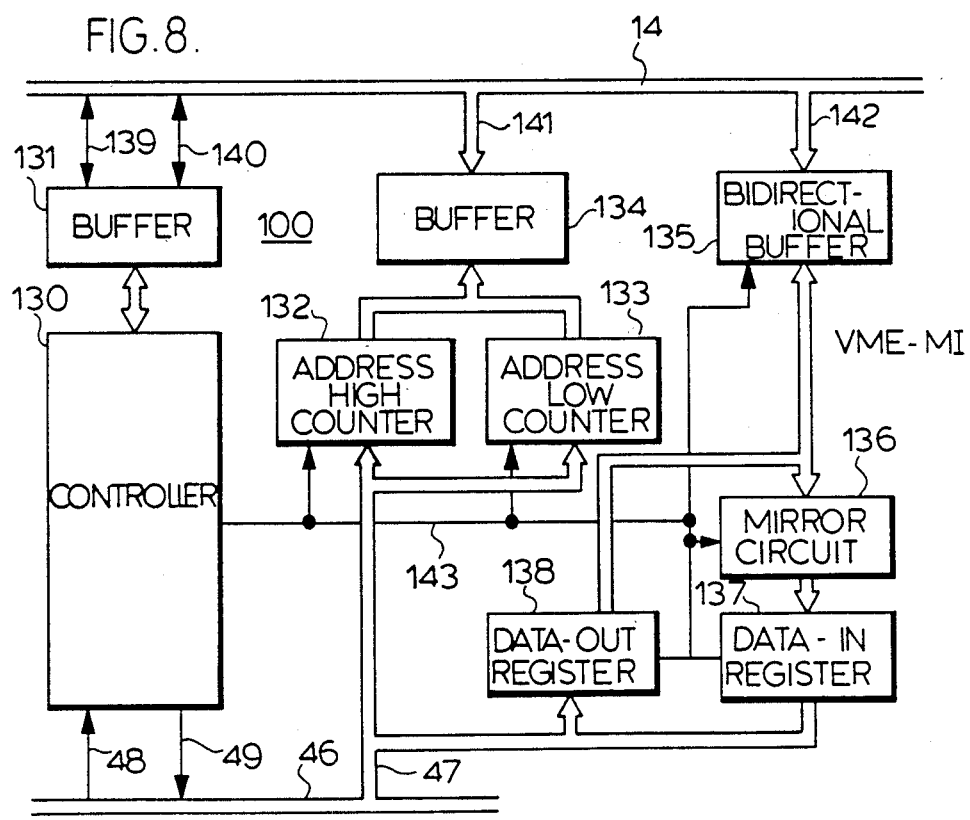
FIG. 8 is a diagrammatic representation of a VME-master interface of the VME-bus interface.

With reference to FIG. 8, VME-MI 100 also comprises data transfer functions. These functions include data base-master (DTB-master) and data base-requester (DTB-requester) To achieve the desired speed in the data transfer VME-MI 100 includes additional functions.

The first function is an address up/down counter formed by an address high counter 132 and an address low counter 133. During the loading of RIM 16 with the bit representations of the various type characters or graphical characters which are each stored separately with consecutive addresses in font memory 13 or RAM 12, counters 132 and 133 are preset for each character with the base address of said character in, for example, RAM 12. Via buffer 134 and the VME address bus 141 of VME bus 14 the base address is supplied to RAM 12, and the first 16-bit word at the respective memory location is supplied via VME data bus 142 of VME bus 14 to a bidirectional buffer 135 and then placed at the correct location in RIM 16. The subsequent address for RAM 12 is generated by increasing counter 133 by 1 and the second 16-bit word is supplied to RIM 16 by VME-MI 100. In a corresponding manner all of the addresses associated with a given character are generated until such time as that character has been completely written into RIM 16.

In this manner CPU 43 needs to generate a base address only once per character so that during loading other functions can be performed, for example pixel processing operations, RIM address determination, and the like.

After a character has been finished, a new base address for a subsequent character is fed to counters 132 and 133 and the cycle described above is repeated.

The second function, the mirror function, is performed with a mirror circuit 136 which is constructed with programmable logic such as FPLAs or PALs and which can be used if characters have to be set rotated through 180° in RIM 16. Mirror circuit 136 interchanges bit 0 of a 16 bit word with bit 15, bit 1 with bit 14, bit 2 with bit 13, etc.

The CPU 43 does not now generate the base address, but calculates, from data relating to the length and width and base address of a character, the highest occurring address for said given character in RAM 12. This highest address is loaded into counters 132 and 133 while the counters are also switched over to down-counters by VME-MI controller 130. After each memory access of RAM 12 the content of counter 133 is reduced by 1 and the 16-bit words from RAM 12 are mirrored in mirror circuit 136 and placed in the RIM 16 via data-in register 137. These cycles are continued until the original base address of the character is reached. In VME-MI 100, a data-out register 138 is also connected via data lines 47 to RIP bus 46 in order to feed data in this manner to, for example, FEC 10 or to RAM 12.

VME-MI controller 130 is connected via control lines 48 and condition lines 49 to RIP bus 46 and, in addition, via buffer 131 to address, data and control lines 139 and bus arbitration lines 140 of VME bus 14.

CPU 43 can call up various modes in VME-MI 100, such as "release bus", "multiple access", "single access" and "change". Before VME-MI 100 can switch to the single- or multiple-access mode, the following data must first also be specified: read or write, normal or mirrored, the desired address and the data to be processed. These specifications can only be altered during the "release bus" mode and during "change" mode. However, the data to be processed always may be changed. This is indicated by a "CHANGE ACKNOWLEDGE" line. The register which contains the read data from VME bus 14 can always be read out if a "REGISTER FULL" line is active.

After calling up a "release bus" mode, VME-MI 100 will unblock VME bus 14. This means that the VME-bus drivers are disabled and a BUSY signal from the VME bus is rendered inactive. The unblocking of VME bus 14 can only take place if the last access cycle is completely finished. A "CHANGE ACKNOWLEDGE" signal indicates that the "release bus" mode is established. In this mode of the interface no access to VME bus 14 can take place. After a "change" request, VME-MI 100 is instructed to seize VME bus 14 if this was not yet the case. This is achieved with the bus arbitration lines 140. The assumption of the "Change" mode is indicated via the "CHANGE ACKNOWLEDGE" line. Access to VME bus 14 can then take place. The contents of the address and data registers also can be changed in the "change" mode. The "change" mode provides a possibility to stop accesses to the VME bus temporarily without the VME bus being unblocked. A single access to the VME bus can be initiated by calling up a "single cycle" mode. If the preceding mode was a "release bus" mode the VME bus is only seized via a corresponding active signal from the arbitration logic. Thereafter only a word access to the VME bus can be performed.

A read/write indicator decides whether a read or write cycle has to be performed. A read cycle means that data from VME bus 14 is clocked into data-in register 137 via mirror circuit 136. Circuit 136 can be activated by means of a normal/mirrored indicator. When data is being clocked into data-in register 137, a REGISTER-FULL flag is set to indicate to CPU 43 that the transfer of data is complete and that the data have entered the register. The REGISTER-FULL flag is set at the instant at which the data is read into data-in register 137, and after this access the content of the address canter is increased by 1. If a mirror function has been enabled, the content of the address counter is decreased by 1. If the REGISTER-FULL flag is still activated and data is being read from the VME-bus, the normal VME cycle is prolonged until the data-in register has been completely read out and new data have been read into data-in register 137.

A write cycle is in principle the same as a read cycle. The only difference is the direction of the data stream. In a write cycle the data which are in data-out register 138 are transferred to VME bus 14. Mirror circuit 136 does not alter anything in the written data. The data-in register 137 must already have been read for it to be possible to clear the REGISTER-FULL flag.

The "multiple-access" mode exhibits many similarities to the "single-access" mode. A "single-access" mode is intended for the reading and writing of commands from, and status information to, the FEC. A "multiple-access" mode is primarily intended for reading graphical and font data, a subsequent access being automatically initiated by VME-MI 100. The new address is generated by the address counter. The only action which has to be performed in this case is the reading of data-in register 137.

The various modes described above are selected with the VME-MODE lines which are connected to some of the signal lines of CPU 43. The read/write selector and the normal/mirrored selector are also connected to such signal lines. The CHANGE-ACKNOWLEDGE and VME register-full signals originate from the WAIT lines of CPU 43. The VME address is stored in 24-bit counters 132 and 133, the input and output data in two 16-bit registers 137 and 138. "Address-high" and "address-low" counters 132 and 133 and the data-out register 138 are loaded by means of register clock lines. The data-in register 137 can be read by means of a register enable line originating from CPU 43.

THE LSM INTERFACE

Figure 5:
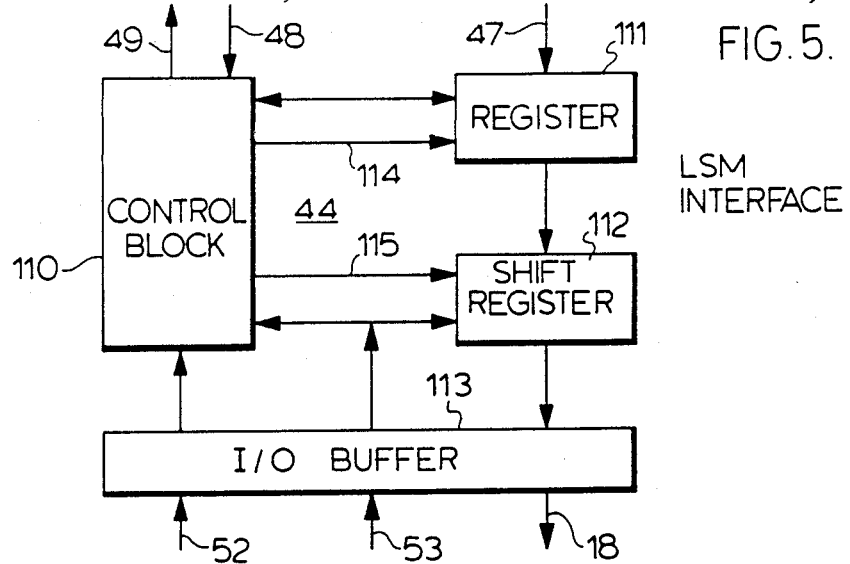
FIG. 5 is a diagrammatic representation of a laser scan module interface.

In FIG. 5, the LSM interface 44 is diagrammatically represented. Upon reading out RIM 16, RIP 15 fetches a 16-bit word from memory and transmits it via data lines 47 of RIP bus 46 to register 111. Control block 110 sends a "load" signal via line 115 to shift register 112 and the content of register 111 is loaded in parallel into the shift register 112. The laser printer emits burst pulses with a frequency of approximately 24 MHz which are supplied via line 53 and I/O buffer 113 to shift register 112 and control block 110. The contents of the shift register 112 is serially shifted out by means of said pulses and is supplied via I/0 buffer 113 via line 18 to the modulator of the ROS.

The burst pulses are supplied to a 16 counter in control block 110 so that once 15 pulses have been counted or during the 16th counting pulse, a word which has now been freshly set in register 111 is transmitted in parallel to shift register 112 and shifted out. Before the shifting-out operation of the 16-bit word is started, however, register 111 is loaded with a new 16 bit-word. An "EMPTY" flag is set once data have been set in the shift register 112 and new data can be written into the register 111. The "EMPTY" flag is connected to a "wait line" of the CPU 43 of the RIP 15. In this manner a whole scan line is transmitted in sequence to the ROS. The control block 110 emits condition signals to the CPU 43 via condition lines 49 of the RIP bus 46. After a scan line has been completed and before a SOS signal is supplied via line 52 from the ROS to control block 110, the fetching of data from RIM 16 is briefly suspended by RIP 15 (wait condition) During this time the register 111 is cleared via line 114. In response to the SOS signal the cycle of filling register 111, transmission to shift register 112, shifting out etc., described earlier is repeated again for a subsequent scan line. After the loading of a word into register 111 the "full" status is likewise transmitted via condition lines 49 to CPU 43, the latter delaying the fetching up of a new word until the content of register 111 has again been loaded into shift register 112. After a PAV signal the number of SOS pulses is counted by means of a counter in CPU 43, and by this means it is possible to ascertain when a page has been transmitted completely to the ROS.

THE CENTRAL PROCESSING UNIT

Figure 6:
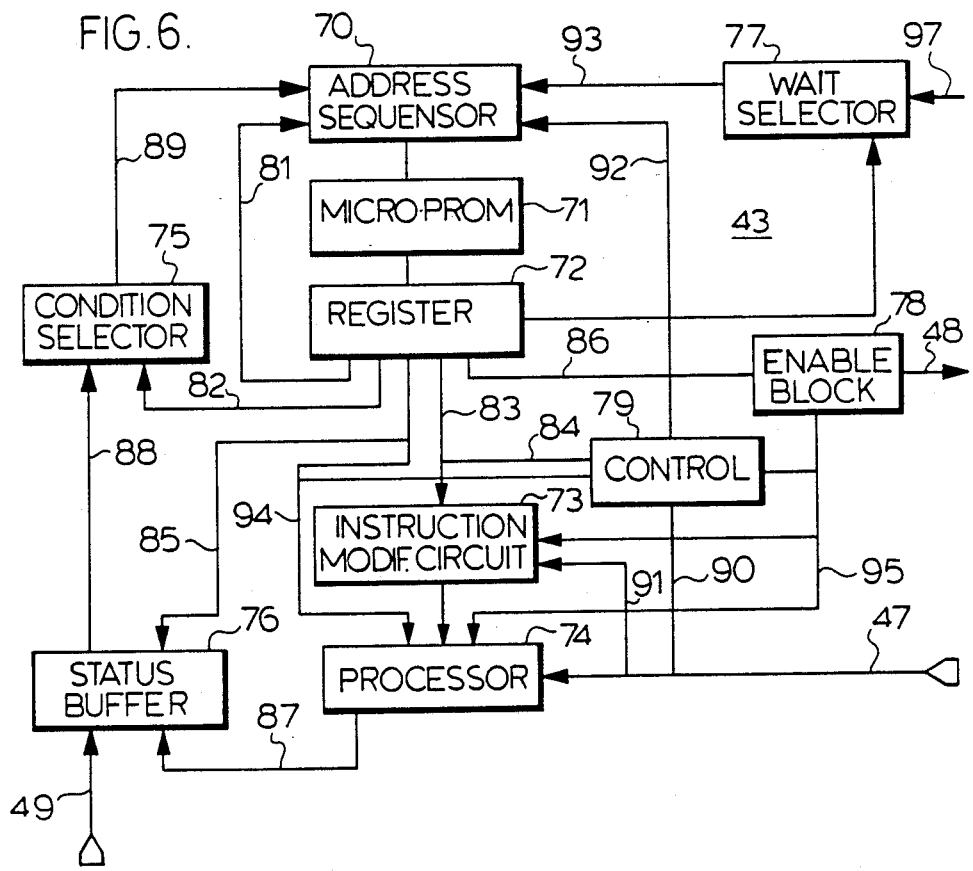
FIG. 6 is a diagrammatic representation of a 16-bits processor system of the raster image processor.

Referring to FIG. 6, CPU 43 of RIP 15 is built around a microprogrammable microprocessor, processor 74, such as a type Am29116, and an associated address sequencer 70, such as a type 2910A, both manufactured by Advanced Micro Devices.

In response to each clock cycle the microinstruction which has to be performed is set in the microinstruction register 72. Said microinstruction originates from micro-PROM 71 and the latter is again addressed by means of the address sequencer 70. In processor 74 every function is controlled by some of the microinstruction bits. The microinstructions can be divided into bits for address sequencer 70, processor 74, branch-address control unit 79, condition selector 75, wait selector 77, and enable block 78.

The sequence in which the microinstructions stored in the micro-PROM 71 are performed is likewise controlled by address sequencer 70. In addition to the possibility of consecutive access to the addresses, conditional branch instructions to every microinstruction in the 4096-size microword area of micro-PROM 71 can be carried out. A LIFO stack provides return-coupling and loop-in possibilities in a microsubroutine. The stack is nine steps deep. For each microinstruction the address sequencer 70 provides a 12-bit address which is initiated from one of the four following sources:

The microprogram address register (PC), which usually indicates an address by an address increase of 1 with respect to the address being handled. However, if a "wait" mode is generated by wait selector 77, the PC is not increased.

An external input connected to lines 92 which obtains its data from the branch address control unit 79.

A nine-step deep LIFO stack which is loaded with the content of the microprogram address register (PC) during a preceding microinstruction.

A register/counter which retains the data which have been loaded from an external input during a preceding microinstruction.

Processor 74 is a microprogrammable 16-bit microprocessor, preferably a type Am 29116, with an instruction set which is optimized for graphical applications. The instruction set for processor 74 comprises, in particular, single and double operand, rotate n bits and rotate and merge.

Processor 74 receives its instructions for performing an operation from the microinstruction register 72 via bus 83 and an instruction-modification circuit 73.

The instruction input is also used as data-input for "immediate" instructions. If the "instruction-enable" (IEN) input of the processor 74 is activated via line 94, the results of the instruction performed are retained in the accumulator and the status register in the processor 74. If an "output enable" (OE) is activated via line 95, the data lines of the CPU 43 are switched as outputs and they contain the content of the ALU of processor 74. Conversely, if the "output enable" is rendered inactive via line 95, the databus of CPU 43 functions as a 16-bit input, and data which are present on the RIP bus can be supplied via data lines 47 to processor 74. Data can then be retained in an internal register. The data bus of processor 74 is connected directly to the data lines 47 of the RIP bus.

The status of the ALU (for example, carry, negative, zero, overflow) is available on the "status bus" 87 of processor 74 during each cycle. Instruction-modification circuit 73 makes it possible to adapt the instructions recorded in micro-PROM 71 to indicate in the case of instructions such as, for example, "rotate n bits", the number of bits with which rotation has to be performed. This number of bits is then specified via a number of lines (91) from processor data lines 47.

If an IEN signal on line 94 renders the instruction input of processor 74 inactive, the same processor instruction bits which are supplied to processor 74 on bus 83 can be supplied via bus 84 also to the branch address control unit 79 and be used to cause address sequencer 70 to branch to a randomly different address. Normally unit 79 receives its branch address from the content of a register which is filled with data from data lines 47 via bus 90.

The condition selector 75 incorporates a one-out-of eight multiplexer, and the output thereof is connected via line 89 to address sequencer 70. One of the eight possible conditions which are applied from condition lines 49 of the RIP bus or from the processor status lines 87 via status buffer 76 and lines 88 to the input of condition selector 75 can be selected. The selected condition is used by address sequencer 70 to perform the desired conditional instruction. Any new conditions can be loaded into status buffer 76 by supplying a selection-enable signal (SLE) via lines 85 to status buffer 76.

The "wait selector" 77 also incorporates a one-out-of-eight multiplexer which, in the active mode, connects one of the eight "wait" lines 97 via line 93 to address sequencer 70. A zero level on a wait line stops the program counter of the program address register. The wait lines are connected to the condition lines of the RIP bus.

The enable block 78 have various functions and generates, in addition, all the signals which are necessary for the control lines on the RIP bus. It performs three different functions:

a. The generation of "enable signals".
   The enable signals determine which of the data registers which are connected by their outputs to the RIP bus have to be activated. For each register there is one enable line.
b. The generation of register clocks.
   The clock lines determine which data registers which are connected by their inputs to the RIP bus have to clock in data. There is one clock line present for each register.
c. The generation of other signals
   The signals on the signal lines are used as flags and function selectors in the interface modules which are connected to the RIP bus.

RASTER IMAGE BUS INTERFACE

Figure 7:
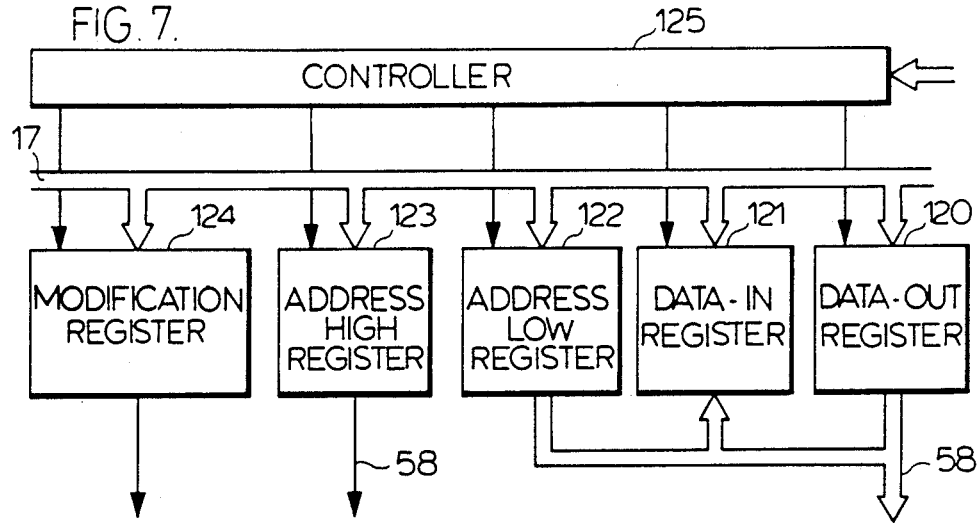
FIG. 7 is a diagrammatic representation of a raster image bus interface.

The connection between RIP bus 46 and RI bus 17 is formed by the RI bus interface 45 shown in FIG. 7. Interface 45 buffers the bidirectional data, the addresses to be called up and the modification code. The buffering is performed by means of various registers, including "data-out" register 120, "address-low" register 122, "address-high" register 123, and modification register 124. These registers can be loaded from RIP bus 46. The loading takes place under the control of address and control lines 48 of the enable block 78 of CPU 43. The "data-in" register 121 can be read out under the guidance of control by means of an enable line of enable block 78. The "address-high" register 123 contains the most significant bits of the address. The "address-low" register 122 contains the least significant bits. After the loading of "address-high" register 123 the RI-bus read/write cycle is automatically started. This means that the following processes are carried out by controller 125:

Cycle 1—sets an address on the RI bus and activates RAV (RI-bus address valid),
Cycle 2—sets data-out on the RI bus and inactivates RAV, and
Cycle 3—reads the data on the RI bus into the "data-in" register 121.

Before the starting of an RI-bus cycle, CPU 43 has to test whether the RI-bus busy line 57 is inactive. A busy line 57 is connected to one of the wait lines of CPU 43.

THE RASTER IMAGE BUS (RI BUS)

RI bus 17 connects RIP 15 to bit-map memory 16 (RIM) and is made up of 64 lines. It comprises a 32-bit wide multiplexed address/data bus. RIP 15 acts on RI bus 17 as a master. The RIM 16, which comprises one or more RIM boards, does not itself take any initiative on the bus. In addition, RI-bus DMA devices which can submit a request to the RIP 15 to obtain control over the bus can be connected to RI bus 17.

RI bus 17 is a synchronous bus. A clock signal (BCLK) is presented to the RI bus by RIP 15. All of the actions on the bus are performed at the edges of the biphase clock. Thus, all of the actions of the RIP take place on the rising edge, and all the actions of the RIM on the falling edge of the clock signal (BCLK). The other modes on RI bus 17 can be described by means of three signal levels, high, low and high-impedance (tristate). All of the alterations in signal levels take place after they have been initiated by an active edge of the biphase clock. There are thus three groups of signals: the clock signals, the address/data signals, and the remaining signals.

The signals which occur on the bus are:
(a) BCLK:
   a symmetrical clock pulse which is presented to the RI bus by the RIP.
(b) RAD 00 . . . RAD 31 (RIP address/data lines):
   a multiplexed address/data way which is driven by all of the bus devices with tristate drivers. All of the lines are active when "high".
(c) RBR 0, RBR 1 (RI-bus bus request):
   with these open-collector signals two DMA devices can request the bus arbiter for access to the bus. The devices are of different priority.
(d) RROFF (RI-busrefresh-off):
   a signal indicating that the RIM -boards can switch off the refresh to achieve a minimum cycle time. To prevent loss of data, a special addressing sequence is maintained between the RIM boards and the RIP.
(e) RBG (RI-bus bus grant):
   with this line bus arbiter indicates that the bus is available to the requesting device with the highest priority.
(f) RBUSY (RI-bus bus busy):
   with this open-collector signal an addressed RIM board can indicate that the board is unable to process a new bus cycle for a certain time.
(g) RAV (RI-bus address valid):
   This tristate signal which is active when low indicates that there is a valid address on the RI bus.
(h) RMC 0 . . . RMC 3 (RIM modify code):
   on these lines a code is presented to the RIM board by the RIP or a DMA device. This code specifies the "modify" function which takes place during the logic operation which is performed on the RIM board on the content of the addressed memory word. These signals are also of the tristate type.

The RI bus is constructed with a 32-bit wide data and address way which is multiplexed for RAD 00 . . . RAD 31. The allocation of these lines is as follows:

A 24 - D 16: in this situation, address lines RA00 . . . RA23 are used. The lines RAD 24 . . . RAD 31 are then in the "don't care" mode. For data lines RAD00 . . . RAD 15 are used. Lines RAD16 . . . RAD31 are at that instant in the "don't care" mode. Data transfer thus takes place on the basis of 16-bit words and the addresses are 24 bits wide.

Another option for using the 32 data and address lines is: A24 - D16 - D16: This situation is the same as the A24 - D16 situation as regards the address lines. By adding a second board in the same address space, in which the data flows through the bus via the lines RAD 16 . . . RAD31, it is possible for a 32-bit wide databus to be created with two boards which are internally 16 bits wide. On a RIM board it is possible for the section of the address/databus over which the data is transferred to be selected.

By means of the RBR0, RBR1 and RBG signals access to the RI bus is regulated between the RIP and optional DMA devices. This arbitration takes place completely outside RIM 16.

Each cycle on the bus consists of a WRITE/READ cycle. If the bus is free (RBUSY not active), the RIP is able to set an address (ADR[n]) on the bus on lines (RAD00 . . . RAD23). This takes place together with the presentation of a RAV-signal and a RI-bus modify code (RM 20 code) via lines RMC00 . . . RMC03. After the address the RIP presents its data (DATA0[n]) to the bus on lines (RAD00 ... RAD15).

The RIM board addressed by ADR[n] renders the RBUSY signal active. The RIP then leaves the RI bus in order to give the RIM board addressed by the ADR[n−1] the opportunity to set DATAI[n−1] on the bus so that the RIP is able to read these data in. Two consecutive WRITE/READ cycles are, as it were, pushed into each other as a result of this. This is still further optimized by making the time which the RIP requires to decide whether RBUSY has become inactive coincide with the last processing phase of the RIM board addressed by ADR[n] in the current cycle. This is achieved by the RIM board making RBUSY already inactive before the RIM board is already completely ready but when it is already quite certain that it will be ready when the RIP has been able to confirm this. The first cycle thus contains invalid data and an additional cycle is also necessary to fetch up the final data from the RIM.

In the manner described above, a minimum cycle time is achieved on the bus. "Minimum cycle time" is the timing sequence of bus modes in which a maximum transfer rate is achieved on the bus.

As a result of the refresh of the RIM it may happen that a RIM board is unable to achieve the minimum cycle time. The RIM boards indicate this by means of the RBUSY signal. By extending this RBUSY signal by a certain number of clock cycles (BCLK), the RIP postpones its subsequent access to the memory by an integral number of clock cycles.

A same situation may occur if the RIP has not yet finished a certain task. The RIP indicates this to the bus by postponing the RAV signal by an integral number of clock cycles.

RASTER IMAGE MEMORY

Figure 11:
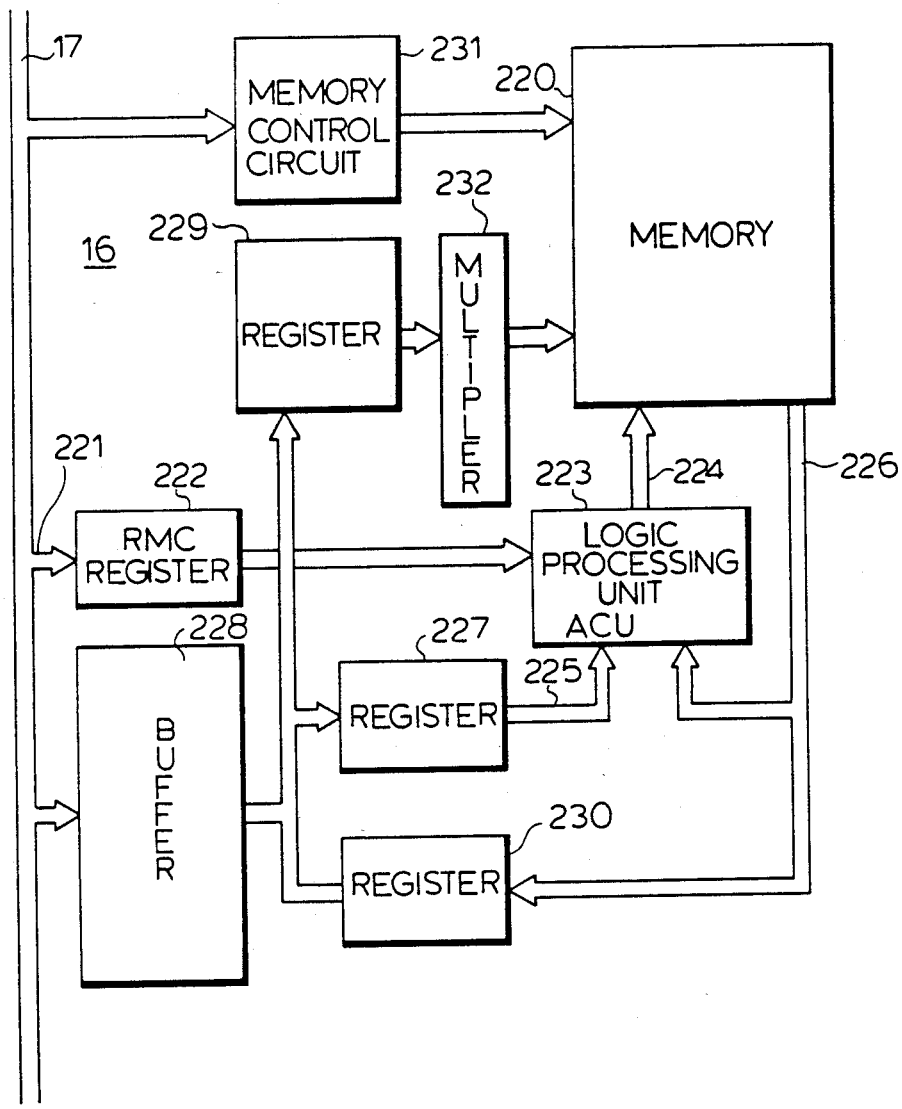
FIG. 11 is a diagrammatic representation of a raster image memory.

RIM 16 shown in FIG. 11 comprises a 24 Mbit dynamic memory 220 organized in 16-bit words which is used as a page-size bit-map memory. Each memory location in the memory 220 corresponds to one precise position on the final printed page. RIM 16 is connected via RI bus 17 to RIP 15 and is filled by RIP 15 with expanded font data and graphical data. An important process which takes place in RIM 16 is the modification process which is performed on an addressed word. The modification process comprises 16 different logic operations which can be applied to the incoming data and the data already present at a certain address. One particular modify function is selected by presenting a RIM modify code to the lines RMC0 ... RMC3 221 of RI bus 17.

The modify code is se in the RMC register 222 and supplied to logic processing unit 223 (ALU) which is made up of programmable logic. The new data (ND) is supplied via DATA0 register 227 over data lines 225 to ALU 223 while the old data (OD) already present in the memory 220 is supplied via data output lines 226 to ALU 223. The result of the processing (MD) in ALU 223 is written into the memory 220 via lines 224.

In the table below, some of the modify functions are represented along with the RM codes associated therewith and the corresponding logic functions.

| | RMC | | | | |
|---|---|---|---|---|---|
| Modify function | 3 | 2 | 1 | 0 | Logic function |
| WRITE | 0 | 0 | 0 | 0 | ND |
| PAINT | 0 | 0 | 0 | 1 | ND.OR.OD |

| | RMC | | | | |
|---|---|---|---|---|---|
| Modify function | 3 | 2 | 1 | 0 | Logic function |
| MASK | 0 | 0 | 1 | 0 | ND.AND.OD |
| ERASE | 0 | 0 | 1 | 1 | ND.AND.OD |
| INVERT | 0 | 1 | 0 | 0 | ND |
| INV. PAINT | 0 | 1 | 0 | 1 | ND.EXOR.OD |
| NOP | 0 | 1 | 1 | 0 | OD |
| CLEAR | 0 | 1 | 1 | 1 | ZERO |
| SET | 1 | X | X | X | ONE |

ND = new data
OD = old data

Because RI bus 17 is a multiplexed bus, the separate addresses and the data are clocked into the registers. For this purpose RI bus 17 is connected to an address-/data bus buffer 228, and when an address is presented to the RI bus 17, it is supplied to address register 229 via buffer 228. When the data is presented (one clock cycle later), the data are stored in the DAT0 register 227 via buffers 228. The data-in register 230 ("in" for the RIP but "out" for the RIM) is provided to set the data originating from the memory 220, which belongs to the previously presented address, onto RI bus 17.

The control of RIM 16 is provided by memory control circuit 231. Memory control circuit 231 contains a bus state sequencer for starting a number of actions in response to a RAV signal. These actions consist of the clocking in of an address, the clocking in of data associated therewith, the clocking in of the modify code, and the setting of data belonging to the preceding address on RI bus 17. In addition, memory control circuit 231 incorporates a memory state sequencer which is synchronized with the bus state sequencer. The memory state sequencer can be initiated by a refresh request or by a bus cycle for a memory access. If a refresh cycle is performed, the next bus cycle has to be suspended. The circuit 231 employs programmable logic.

Memory 220 is made up preferably of 256 K dynamic memory chips and is organized in six "banks" of 256 K words of 16 bits. Bank selection takes place through decoding the address lines A18, A19 and A20 in address multiplexer 232. The addressing of a memory location in one bank takes place by means of address lines A0–A7 and A16 and the generation of a row address strobe (RAS) from control circuit 231, and address lines A8, A15 and A17 are then supplied to the memory address lines via address multiplexer 232, and a column address strobe (CAS) is also generated by control circuit 231.

Because dynamic memories are used, preferably, all the memory locations of memory 220 undergo a refresh at least once every 4 msec. This is done by periodically adding a "RAS-only" cycle. During this cycle a row address is presented to all the banks. The refresh address in a row is derived by means of a 9-bit counter which is increased by 1 after each refresh cycle.

By activating the RROFF line of RI bus 17 the normal refresh cycle is interrupted and RIP 15 ensures that the minimum cycle time of the next cycle is met. Non-addressed banks of the memory then use the address on RI bus 17 to perform a refresh. On the addressed bank refresh takes place by an access to the selected address.

If only one copy of a page has to be made, the "CLEAR" modify code will be set on RI bus 17 during the reading out of RIM 16 because after reading out RIM 16 must be completely filled with zeros. If the page has to be kept in order to be printed yet once more, the "NOP" modify code will be set on RI bus 17.

GRAPHICAL INSTRUCTIONS

The bit-map filler 28 (FIG. 2) is designed to perform various textual and graphical instructions such as CHAR, MCHAR, LINE and CIRCLE. All of these instructions, which are stored in micro-PROM 71 (FIG. 6), are performed as microinstructions for CPU 43. The algorithms for these instructions are implemented in a manner to obtain a bit-map filling speed which is as large as possible.

CHAR is an instruction for the placing of a character at the correct location in bit-map memory 16. Since the word boundaries of a character generally do not correspond to the word boundaries of the bit-map memory, displacement is necessary (FIG. 9). In font memory 13, bit-map representation 200 of character 201 is stored in 16-bit words. A character usually comprises a number of 16-bit words, some of which are indicated by numerals 203, 204 and 205. Corner point 202 of character 201 is taken here as an example of a reference point, and the first 16-bit word 203 contains 16 bits of which the first bit is denoted by "O" and the last bit by "F". The bit representation of the first word is thus: 0000 0000 0001 1111.

When character 201 is placed at the desired y location in bit-map memory 16, word boundary 207 of the bit-map memory will on the whole only rarely coincide with the word boundary 0' of the character 201. The operation to be carried out will thus correspond to the displacement of the bit-map representation of character 201 over a number of (n) bits denoted by $\Delta y$ in the Figure.

At the microinstruction level the following steps have to be carried out for this purpose:

Rotate: from bit O to bit F over $\Delta y$ (n:=$\Delta y$)
Merge:
  mask=1 rotate
  mask=0 non-rotate MCHAR is an instructioning a character in bit-map memory 16 in mirrored form. The reading out of the bit-map representation of the character by the VME-bus interface takes place in reverse sequence. The displacement of the word boundaries of the character in the bit-map memory 16 takes place in an identical manner to that described for CHAR. The circuit for the mirroring is also accommodated in the VME-bus interface.

For writing characters, lines, circles and so on into bit-map memory 16, the front end has a number of overlay options. See, for example, FIG. 10. These options are represented diagrammatically in FIG. 10 by reference to a letter V (210). A hatching 211 means that the content of the RIM 16 is unaltered. It is assumed that a "0" in the RIM produces "white" and a "1" in the RIM produces "black".

WRITE the existing content of the RIM 16 is made "0" and the bit map representation of a character is written with ones (212).

INVERT the existing content of the RIM is made "1" and the bit-map representation of a character is written with zeros (216).

PAINT the content of the RIM is not deleted and the ones of the character undergo an "OR" function with the content of the RIM (213).

MASK the content of the RIM is made "0" at the locations where the character contains zeros, and where the character contains ones the content of the RIM is maintained (214).

ERASE the content of the RIM is made "0" at the locations where the character contains ones, and where the character contains zeros the content of the RIM is maintained (215).

INVERTING PAINT the content of the RIM is maintained where the character contains a "0" and where the character contains a "1" the content of the RIM is inverted.

To produce lines, circles and arcs of circles use is made of the measuring and regulating methods based on the Bresenham algorithm. In this case the starting point is the theoretical shape of the lines and for each scan line that point is chosen which most closely approaches said desired line. The known algorithm is, for example, described in ACM Transaction on Graphics, Vol. 1, No. 4, October 1972, pages 259-279 by Robert F. Sproull under the title "Using Program Transformations To Derive Line-Drawing Algorithms".

For the generation of circles with a line thickness of one pixel, an algorithm is used as described, for example, by J. Bresenham in Communications of the ACM, February 1977, Volume 20, No. 2, pages 100-106, "A Liniar Algorithm For Incremental Digital Display Of Circular Arcs". In this way circles can be drawn on a raster shaped display using only simple and hence fast instructions, such as testing a character, adding and subtracting.

A method of generating straight line parts of a thickness of 3 or more pixels, the said line part being stored in a word-oriented bit-map memory, is described hereinafter.

The line part has a specific thickness (D) and round ends. The starting point and end point coincide with a raster point and the thickness is an odd multiple of the raster spacing. It is assumed that the raster is a bit map situated in a word-oriented memory. In the description of the algorithm use is made of a clockwise-rotating cartesian coordinate system consisting of a x-axis and an y-axis. The memory organization is such that the words in the memory lie parallel to the y-axis.

Figure 12:
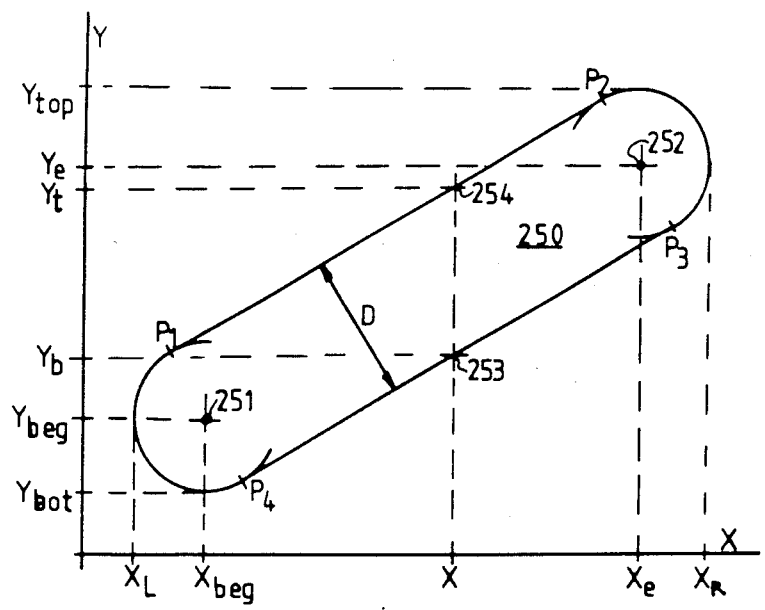
FIG. 12 represents a line part having rounded ends.

A line part 250 (FIG. 12) is given by the coordinates of starting point 251 (Xbeg, Ybeg), the coordinates of end point 252 (Xe, Ye) and thickness D measured in the raster spacing. The boundary of the line part 250 is given by a closed curve situated in the area $XL <= X <= Xr$, $Ybot <= Y <= Ytop$). Associated with each value of X ($XL <= X <= Xr$) are two points, 253, (X, Yb) and 254 (X, Yt) situated on the boundary of the line part. The area that the vertical line parts (thickness zero) from (X, Yb) to (X, Yt), where ($XL <= X <= Xr$) together cover is equal to the area occupied by the line part of thickness D. The imaging of the line part can thus be reduced to imaging the vertical line parts for successive values of X between the points Yb and Yt. The vertical line parts lie in the word direction of the memory. For imaging of the line part of thickness D the starting points and end points of these vertical line parts must be determined. These points are generated by determining the image of the boundary of the line part of thickness D. Tee line part 250 of thickness D can be considered as being bounded by a line through P1 and P2, a line through P3 and P4, an arc of a circle through P3 and P2 and an arc of a circle though P4 and P1. As already stated, line parts can be imaged by Bresenham's algorithm. For this it is necessary that the starting point and end point of the line part coincide with a raster point. In most cases, however, the points P1, P2, P3 and P4 will not coincide with a raster point, but are each surrounded by four raster points: Pi1, Pi2, Pi3 and Pi4 (i=1 ... 4).

Figure 13:
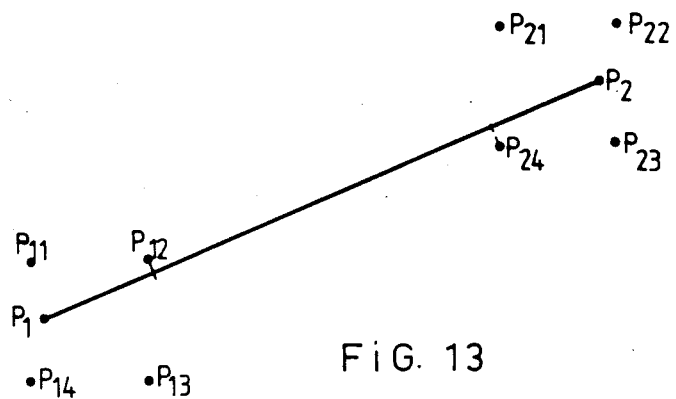
FIG. 13 represents a line through the points P1 and P2.

FIG. 13 represents an image of a line through the points P1 and P2. Of the raster points P1j (j=1 ... 4), the point having the smallest distance from the line must be selected as the starting point of the line part to be imaged, in this case therefore, point P12. The end point, point (P24), of the line part to be imaged is chosen similarly. Bresenham's algorithm is also used for imaging circles. The starting point (Xbeg, Ybeg) and the end point (Xe, Ye) of the line part of thickness D to be imaged now coincide with the raster point. This therefore satisfies the requirement of Bresenham's algorithm to the effect that the center point of the circle must coincide with the raster point. Not all the raster points of the circle image have to be generated, but only the points which belong to the image of the arcs of the circle which with the imaged line parts form the image of the boundary of a line part of thickness D. The coordinates of the raster points of intersection P1*, P2*, P3* and P4* can now be determined by means of data concerning the starting point and the end point and the thickness of the line part.

Figure 14:
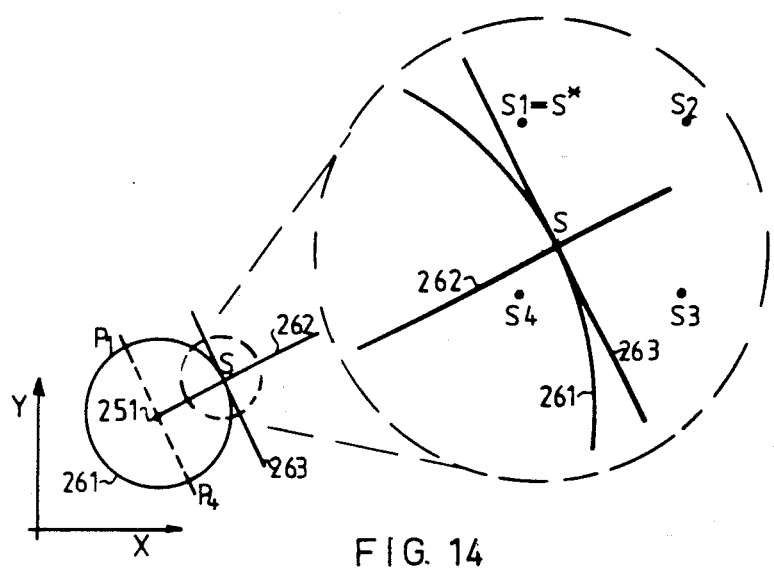
FIG. 14 is a detailed illustration of the determination of the point of intersection of the line and a circle around the point of origin of said line.

Given a circle 261 (FIG. 14) with center 251 (Xc, Yc) and radius R, and a line part 262 having the starting point (Xbeg, Ybeg). The starting point of the line part and the center of the circle coincide with point 251. The radius R of the circle 261 is equal to (D−1)/2. The circle 261 and the line part 262 intersect at the point of intersection S. Of the four raster points S1, S2, S3 and S4 which surround S, the one having the smallest distance from the tangent 263 to the circle 261 through S must be selected. This raster point S* with the coordinates (X*, Y*) provides the information for determining the coordinates of the raster points of intersection P1*, P2*, P3* and P4*, i.e.. the starting points and the end points of the two line parts of the boundary. In these conditions the perpendicular distances from the point S* to the center 251 (Xc, Yc) of the circle 261 are determined, where Hx=X*−Xc, and Hy=Y*−Yx. The following follows from this for the coordinates of the raster points of intersection:

P1*: ([Xbeg−Hy], [Ybeg+Hx]),

P2*: ([Xe−Hy], [Ye+Hx]),

P3*: ([Xe+Hy], [Ye−Hx]), and

P4*: ([Xbeg+Hy], [Ybeg−Hx]).

The points P1* to P4* now coincide exactly with the raster points. The images of the line part 262 and the circle 261 on the raster are determined with Bresenham's algorithms.

In the generation of a line part it is assumed that the center of the circle coincides with the origin of the system of axes and that a line part is situated in the first octant. This assumption does not detract from the generality, since the other cases can be transformed to this case by a simple translation.

Figure 15:
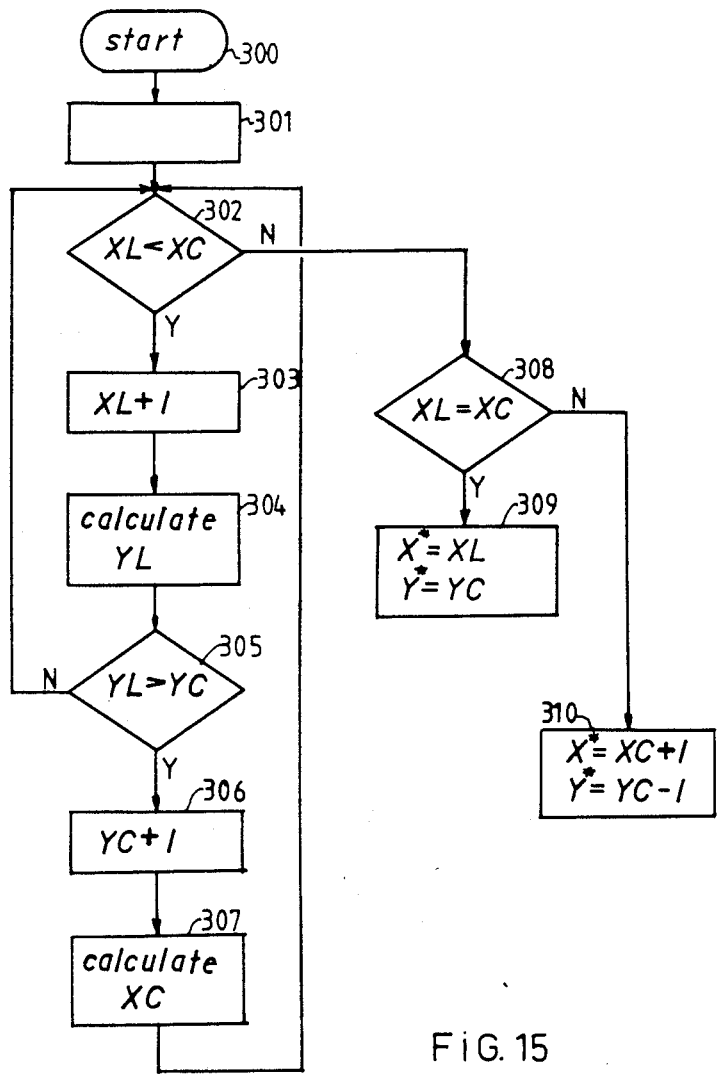
FIG. 15 is a flow diagram of a method for determining the point of intersection S*.

The Bresenham algorithm for the line part is started at the origin of the system of axes and the Bresenham algorithm for the circle is started at the point (R, 0), where R is the radius of the circle. These algorithms are carried out quasi-parallel at the front end. The raster points which are generated are synchronized on an equal y-value. With the next algorithm the coordinates (X*, Y*) of the point of intersection S* are determined. The algorithm converges to the area around the point of intersection S. In this area a selection is made for S* with the coordinates (X*, Y*). FIG. 15 represents the determination of the point of intersection S* in a flow diagram. After the start (300) of the algorithm, the various variables of the line and the circle are first initiated (301): XL=0, YL=0, XC=R and YC=0. If the condition XL<XC (302) is satisfied, the value of XL is increased by one (303). The value for YL of the line is then calculated with Bresenham's algorithm (304). If the condition YL>YC (305) is not satisfied, the program returns to block 302. If XL<XC still applies, the program loop consisting of blocks 303 and 304 is again run through and the value XL is again compared with YC in block 305. If the condition YL>YC is satisfied, YC is increased by one (306) and XC is calculated for the circle by means of Bresenham's algorithm (307), after which the program returns to 302. In this way the two program loops consisting of blocks 302 to 305 and blocks 302 to 307 are run through until XL is no longer less than XC (302). The program then jumps to block 308. If XL =XC now applies, X* is made equal to XL and Y* to YL (309). If XL>XC (308), then the following applies for the values of X* and Y* (310):

$X^* = XC+1$ and $Y^* = YC-1$.

The line parts 250 (FIG. 16) is given by the coordinates of the starting point (Xbeg, Ybeg), the coordinates of the end point (Xe, Ye) and the thickness D measured in the raster spacing. It is assumed that Xe>=Xbeg and Ye>=Ybeg. In other words, the line part makes an angle between 0° and 90° with the positive x-axis. If Xe<Xbeg, then the assumption Xe>=Xbeg can be satisfied by exchanging the starting point and the end point. If Ye<Ybeg, the assumption Ye>=Ybeg can be satisfied by mirror imaging a line part about the horizontal line y=Ybeg (Ye⁰=2×Ybeg−Ye). The starting points and end points of the vertical line parts must, however, then first be mirror imaged about the line y=Ybeg before the raster points belonging to the image of these vertical line parts are activated (in the bit map).

Figure 16:
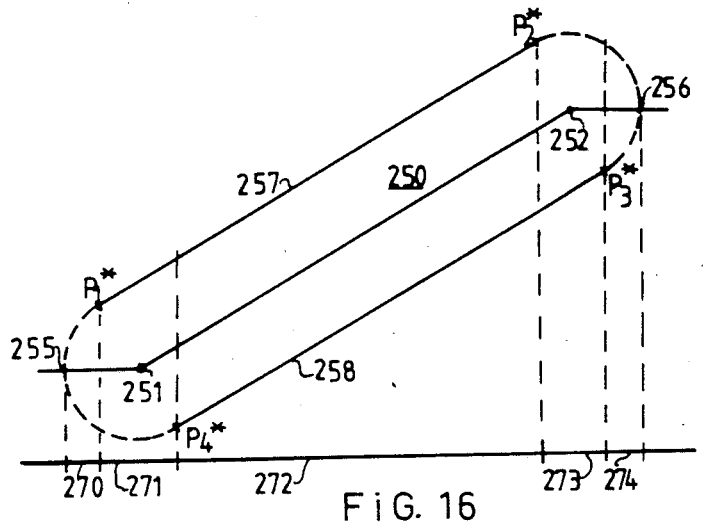
FIG. 16 represents a line part imaged on raster points.

After the determination of S*, the coordinates of P1* (X1*, Y1*), P2* (X2*,Y2*), P3* (X3*, Y3*) and P4* (X4*, Y4*) are determined by means of Hx and Hy in the manner described hereinbefore. The data are now available for performing quasi-parallel four algorithms, two line and two circle algorithms. In FIG. 16, circle 1 runs from pont 255 to P1* and from P2* to point 256, circle 2 runs from point 255 to P4* and from P3* to point 256. Line 1 runs from P1* to P2* and line 2 runs from P4* to P3*. The circle algorithms 1 and 2 generate a semi-circle which on reaching P1* and P4*, respectively, replace the center 251 (Xbeg, Ybeg) by the center 252 (Xe, Ye). The line generation successively tranverses the areas 270 to 274.

Figure 17A:
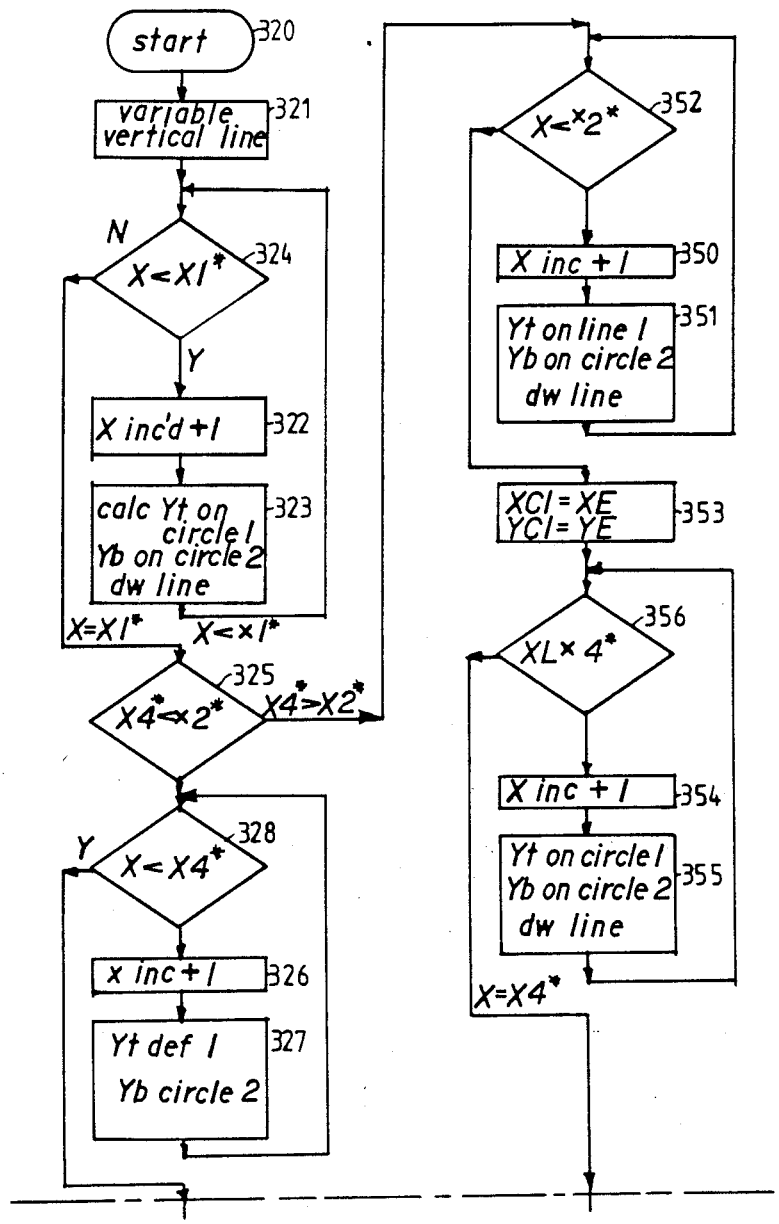
FIGS. 17 a, b, and c represent a flow diagram of a method of generating a line part with rounded ends.
Figure 17B:
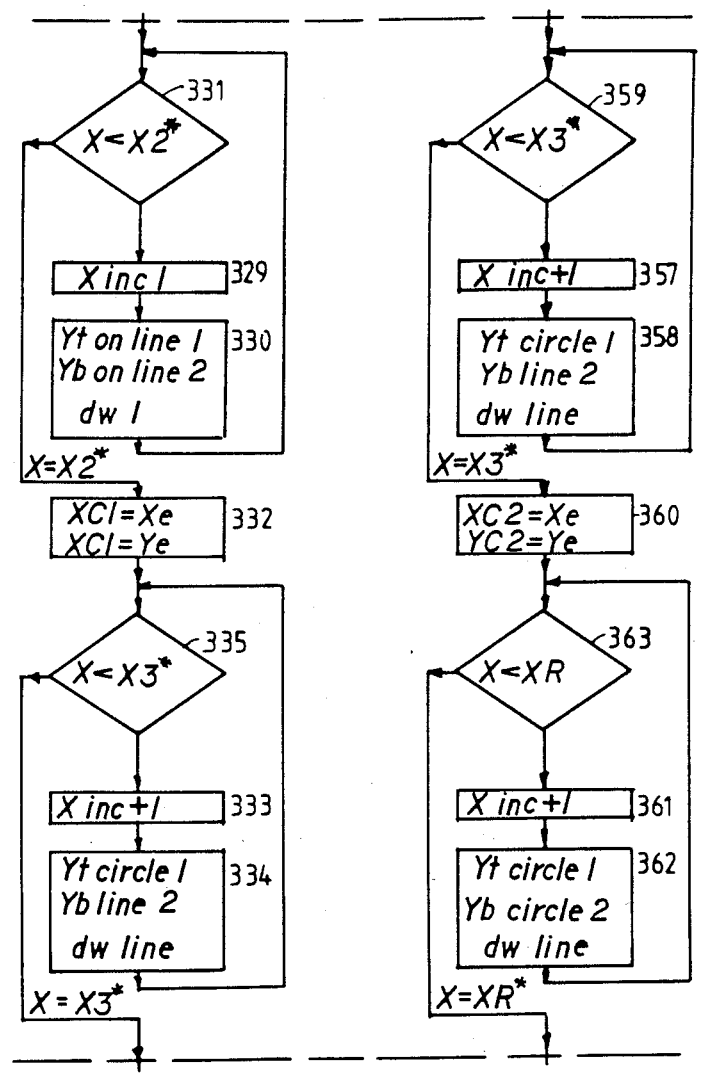

The algorithm used is represented in a flow diagram in FIGS. 17a, b and c. The program starts (320) with the initiation of a number of variables (321) such as R=(D−1)/2, X1=Xbeg−R, XR=Xe+R, Xc1=Xbeg, Yc1=Ybeg, Xc2=Xbeg, Yc2=Ybeg, X=X1, Yt=Ybeg and Yb=Ybeg. The first vertical lne is also drawn (321) for X=X1. The code (Drln (X, Yb, Yt)) is used to indicate the instruction: draw a vertical line at this X, between the points Yb and Yt and place this line on the corresponding position in the bit-map memory. The calculation and generation of the vertical lines in the area 270 is then started (FIG. 16). X<X1* is tested (324). If this applies, X is first increased by one (322) and the point Yt on circle 1 and the point Yb on circle 2 are determined for this value of X by means of Bresenham's algorithm (323). The vertical line is also drawn between Yb and Yt (323) (Drln (X, Yb, Yt)) and the program returns to 324. As long as X<X1* applies, the loop 322, 323 and 324 is always run through.

When X=X1*, the program goes to block 325. In this a comparison is made to see whether X4*<X2*. If the answer is no, then as will be explained hereinafter the program is run through from block 350 to block 364. This applies, for example, for steep lines and for lines which are short with respect to their thickness. When X4*<X2* (325) applies and X<X4* (328) applies, X is increased by one (326) and by means of Bresenham's algorithm the point Yt on line 1 and the point Yb on circle 2 are determined for this value of X (327). Also for this value of X the vertical line is drawn between Yb and Yt (323) (Drln (X, Yb, Yt)) and stored in the memory. As long as X<X4* (328) applies, i.e., for the area 271 (FIG. 16), the program loop 326, 327 and 328 is run through. On reaching X=X4*, a test is carried out whether X<X2* (331) and if this is the case the program continues by increasing the value of X by one (329), calculating Yt on line 1 and Yb on line 2 by means of Bresenham's algorithm and again Drln (X, Yb, Yt) (330). long as X<X2* (331) applies, i.e.. for the area 272 (FIG. 16) the program loop 329, 330 and 331 is run through. On reaching X=X2*, first the original variables Xc1 and Yc2 are changed in value in block 332 by now filling in the coordinates of the end point of line part. Hence Xc1=Xe and Yc1=Ye. Generation of the area 273 (FIG. 16) then takes place. A test is made whether X<X3* (335) and if so the value of X is increased by one (333) and the value for Yt on circle 1 and the value for Yb on line 2 are determined by means of Bresenham's algorithm (334). The associated vertical line is placed in the bit-map ,memory with Drln (X, Yb, Yt) (334). As long as X<X3* (335) applies, the program loop 333, 334 and 335 is run through. When X reaches the value for X3* the original variables Xc2 and Yc2 are adjusted (336) in accordance with: Xc2=Xe and Yc2=Ye.

Generation now takes place for the last area 274 of the line part. If X<XR (339) applies, X is again increased by one (337) and Bresenham's algorithm is used to determine Yt on circle 1 and Yb on circle 2 (338) and the vertical line is placed in the bit-map memory with Drln (X, Yb, Yt). As long as X<Xr (339) applies, program loop 337, 338 and 339 is run through. When X reaches the value XR, generation of the line part is completed and the program stops in block 364.

For steep lines (X4*>X2*) the program jumps from block 325 to 352. When X<X2* (352) applies the value o f X is increased by one (350) and Bresenham's algorithm is used to determine Yt on line 1 and Yb on circle 2 (351) and this vertical line is written into the bit-map memory (351) with Drln (X, Yb, Yt). As long as X<X2* (352) applies, the program loop 350, 351 and 352 is run through. Just as in block 332 the variables for Xc1 and Yc1 are also changed for X=X2* to Xc1=Xe and Yc1=Ye (335). When X<X4* (356) applies, X is increased by one (354) and Bresenham's algorithm is used to determine Yt on circle 1 and Yb on circle 2 (355) and the line between Yb and Yt is placed at the corresponding location (356) applies, the program loop 354, 355 and 356 is run through. At X=X4* a test is made whether X<X3* (359) and if so X is increased by one (357) and Bresenham's algorithm is used to determine Yt on circle 1 and Yb on line 2 and this line is stored in th memory with Drln (X, Yb, Yt) (358). At X<X3* (359) the program loop 357, 358 and 359 is continually run through. When X=X3* the variables are changed (360): Xc2=Xe and Yc2=Ye. As long as X<XR (363) applies, X is increased by one (361) and Bresenham's algorithm is used to determine Yt on circle 1 and Yb on circle 2 (362) and a memory storage takes place with Drln (X, Yb, Yt) (363). As long as X<Xr (363) applies, the program loop 361, 362 and 363 is run through. When X reaches the value XR the line generation is over and the program stops (364).

Figure 18:
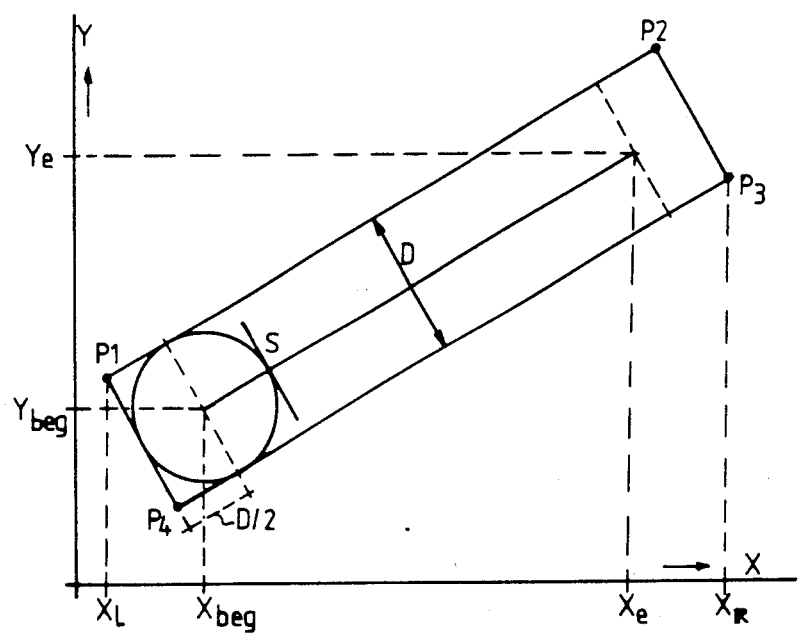
FIG. 18 represents a line part with straight ends.

An algorithm can be prepared in a corresponding manner for line parts with straight ends. FIG. 18 represents a line part of this kind. The boundaries of the line part are the points, P1, P2, P3 and P4. Just as in the generation of a line part with round ends, these points must coincide with the raster points P1*, P2*, P3* and P4*. These points are accordingly determined: S* is first determined by an algorithm as described in connection with FIG. 15. The auxiliary functions Hx and Hy are then defined in accordance with Hx=X*−Xc and Hy=Y*−Yc. From this the following again applies:

P1*: ([Xbeg−Hy−Hx], [Ybeg Hx−Hy])

P2*: ([Xe−Hy−Hx], [Ye+Hx−Hy]),

P3*: ([Xe+Hy−Hx], [Ye−Hx−Hy]), and

P4*: ([Xbeg+Hy−Hx], [Ybeg−Hx−Hy]).

All the data are now known for determining the line parts P1* P2*, P4* P3*, P1* P4* and P2* P3* which denote line 1, 2, line 3 and line 4, respectively, and the program can be written to generate the line. For example, the following program written in Pascal can be used:

```
X1: = X1*;
Xr: = X3*;
X: = X1;
Yt: = Ybeg;
Yb: = Ybeg;
DrawVerticalLine(X,Yb,Yt);
IF (X4* < X2*) THEN
BEGIN
   WHILE (X < X4*) DO
   BEGIN
      X: = X + 1;
      BRESENHAM_LINE1_STEP(Yt);
      BRESENHAM_LINE3_STEP(Yb);
      DrawVerticalLine(X,Yb,Yt)
   END;
                                          [X = X4*]
   WHILE (X < X2*) DO
   BEGIN
      X: = X + 1;
      BRESENHAM_LINE1_STEP(Yt);
      BRESENHAM_LINE2_STEP(Yb);
      DrawVerticalLine(X,Yb,Yt)
   END;
                                          [X = X2*]
   WHILE (X < Xr) DO
   BEGIN
      X: = X + 1;
      BRESENHAM_LINE4_STEP(Yt);
      BRESENHAM_LINE2_STEP(Yb);
      DrawVerticalLine(X,Yb,Yt)
   END;
END
                                          [X = Xr]
      ELSE
```

```
                    -continued
BEGIN
    WHILE (X < X2*) DO
    BEGIN
        X:= X + 1;
        BRESENHAM_LINE1_STEP(Yt);
        BRESENHAM_LINE3_STEP(Yb);
        DrawVerticalLine(X,Yb,Yt)
    END
                                            [X = X2*]
    WHILE (X < X4*) DO
    BEGIN
        X: = X + 1;
        BRESENHAM_LINE4_STEP(Yt);
        BRESENHAM_LINE3_STEP(Yb);
        DrawVerticalLine(X,Yb,Yt)
    END;
                                            [X = X4*]
    WHILE (X < Xr) DO
    BEGIN
        X: = X + 1;
        BRESENHAM_LINE4_STEP(Yt);
        BRESENHAM_LINE2_STEP(Yb);
        DrawVerticalLine(X,Yb,Yt)
    END;
END
                                            [X = Xr]
```

The above-described algorithms make use of the word organization of the memory and guarantee that the number of accesses to the memory is minimal. The thickness of a line part is usually small in comparison with the length of that line part. This implies that relatively little time is required to determine the coordinates from P1* to P4* so that "solid" lines can be very quickly imaged on a raster.

The invention is not restricted to the embodiments described. Thus line parts can be implemented on rasters other than orthogonal with comparable methods of line generation. These and other methods which those skilled in the art will readily be able to derive from the line generations described will, however, all fall within the scope of the following claims.

What is claimed is:

1. A method for generating on a homogeneous raster a line part having a thickness D, where D is at least as great as the space between two raster points, and wherein the raster points are arranged in a number of parallel lines, and the bit representation of said line part is stored in a word-oriented bit-map memory in the form of a large number of image points or pixels, the image points grouped together in words, the words stored in a word direction in the bit-map memory, said method comprising:

a. determining an envelope of said line part to be generated and imaging said envelope on the raster points, by
  i. determining the image of a starting point (X*, Y*) and end point of said line part on the raster points, and generating a circle having said starting point as the center (X*, Y*) and a radius $(D-1)/2$;
  ii. determining four raster points where a point of intersection (S) of said circle with a line through said starting point and said end point is located within said four points; and
  iii determining a raster point (S*) in the direction vicinity of said point of intersection (S) having the smallest distance from a tangent to said circle through intersection (S), and by means of said determined raster point (S*), determining four raster points of intersection (P1* to P4*) as points of said image envelope;

b. determining for all successive raster lines the length of a section through the line part; and c. placing the bit representation of said lengths in the bit-map memory on said lines at corresponding locations, the direction of said determined lengths corresponding to the word direction of the bit-map memory.

2. A method according to claim 1 for generating a line part having round ends, wherein said four raster points of intersection (P1* to P4*) form the images of the junction points between the round ends and the straight enveloping lines of said line part.

3. A method according to claim 1 for generating a line part having straight ends, wherein said four raster points of intersection P1* to P4*) form the images of the corner points of the enveloping lines of said line parts.

* * * * *